J. F. McELROY.
ELECTRIC HEATER.
APPLICATION FILED JAN. 23, 1911.
992,728.
Patented May 16, 1911.
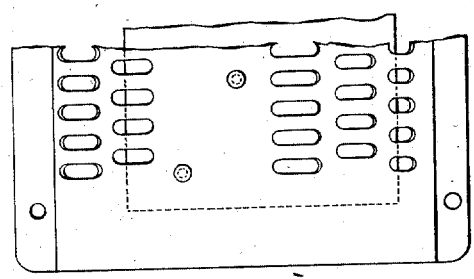
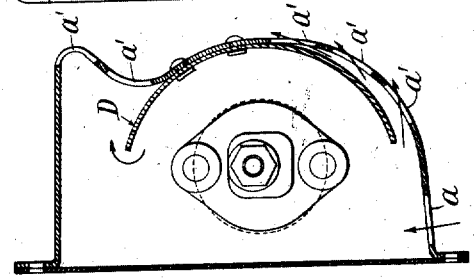
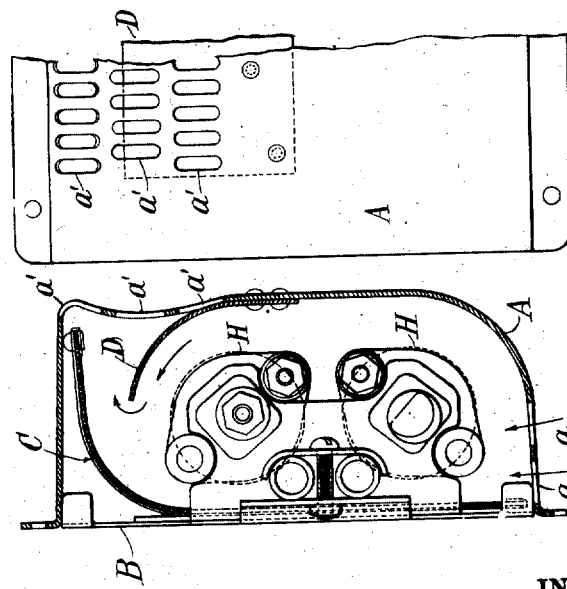
WITNESSES:
L. T. Shaw
O. B. Titus
INVENTOR
James F. McElroy
BY
E. M. Bentley
ATTY

UNITED STATES PATENT OFFICE.

JAMES F. McELROY, OF ALBANY, NEW YORK, ASSIGNOR TO CONSOLIDATED CAR HEATING COMPANY, A CORPORATION OF WEST VIRGINIA.

ELECTRIC HEATER.

992,728. Specification of Letters Patent. Patented May 16, 1911.

Application filed January 23, 1911. Serial No. 604,247.

*To all whom it may concern:*

Be it known that I, JAMES F. McELROY, a citizen of the United States, residing at Albany, county of Albany, State of New York, have invented certain new and useful Improvements in Electric Heaters, the following being a full, clear, and exact disclosure of the one form of my invention which I at present deem preferable.

For a detailed description of the present form of my invention, reference may be had to the following specification and the accompanying drawings forming a part thereof, in which—

Figure 1 shows a section of a side-wall heater with a deflector wall in its outer half; Fig. 2 shows a partial front elevation of the heater of Fig. 1; Figs. 3 and 4 show respectively a section and partial front elevation of a modified form of heater similar to that of Figs. 1 and 2.

My invention relates to electric heaters and particularly to a form of casing therefor which will allow a free emission of the heat but will prevent contact with the heater coils of nails, hat pins, umbrella rods or other objects which might accidentally enter the emission openings in the casing.

Referring to the drawings, H represents an electric heater resistance which may be of any desired form, usually a length of wire compactly disposed on porcelain insulator supports. It does not require any detailed description herein.

A represents an external casing for the heater, separable from the unperforated back plate B which carries the heater coils H. The casing A is provided with inlet openings $a$, $a$ for the cold air at the bottom and with outlet openings $a'$, $a'$ at the upper and outer corner for the emission of the air heated by the heat generated in the coils. Inside of this casing A and back of the outlet openings $a'$ $a'$ $a'$ is a shield or deflector D riveted to and carried by the wall of the casing A. This deflector plate D is spaced away from the outer wall by being curved inwardly a sufficient distance to allow of the flow of air currents up through and in front of the heater H and then around the upper edge of the deflector plate to the outlet openings $a'$ $a'$ $a'$. These air currents are furthermore directed in the route downward by a curved plate C, which passes up behind the heater H but spaced therefrom and at its upper end is turned outward toward the front of the casing but spaced a slight distance away from the top of the casing at its outer edge.

Figs. 3 and 4 show a modification which is somewhat simpler. In this case the deflector plate D is riveted to the front wall of the casing at a point slightly above its center and its upper and lower edges are both curved inward away from the casing wall while outlet perforations $a'$ are provided in the said wall at points opposite both the upper and the lower halves of the deflector plate. In both cases the curving of the deflector plate is such as to bring some portion of it across the direct line from the heater to the outlet openings, and yet at such a distance from the heater H as will permit an adequate flow of air between the heater and deflector.

What I claim as new and desire to secure by Letters Patent is:

1. An electric heater, comprising a heating resistance, a casing therefor having openings for the emission of heat, and a deflector plate supported by one wall of said casing and covering the said openings but separated by an air space from the portion of the wall of the casing in which the openings are formed.

2. An electric heater, comprising a heating resistance, a casing therefor having openings for the emission of heat, and an internal deflector plate covering the said openings but separated by an air space from the portion of the wall of the casing in which the said openings are formed.

3. An electric heater, comprising a heating resistance and a casing therefor having an inner deflector with an air-opening around it, and an outer wall provided with a corresponding opening out of line with and separated from said deflector by an air space.

4. An electric heater, comprising a heating resistance, a casing therefor provided with air openings, and an internal deflector in line between said openings and the resistance but not separated by an air space from the wall of the casing and from the heater.

5. An electric heater, comprising a heating resistance, a casing therefor provided with air openings and a deflector carried by said casing and in line between said openings and the heating resistance but separated by an air space from the portion of the casing wall that contains said openings.

6. An electric heater, comprising a heating resistance, a casing therefor having air openings, and a curved deflector supported by one wall of said casing and opposite said openings but separated by an air space from the portion of the casing-wall in which said openings are located.

In witness whereof I have hereunto set my hand, before two subscribing witnesses, this 20th day of January, 1911.

JAMES F. McELROY.

Witnesses:
ERNEST D. JANSEN,
ROBERT McCOCHRANE.